United States Patent
Xia et al.

(10) Patent No.: US 8,153,032 B2
(45) Date of Patent: Apr. 10, 2012

(54) TRANSITION METAL HYDROXIDE AND OXIDE, METHOD OF PRODUCING THE SAME, AND CATHODE MATERIAL CONTAINTING THE SAME

(75) Inventors: WenQiang Xia, Shenzhen (CN);
ChaQing Xu, Shenzhen (CN);
ZhanFeng Jiang, Shenzhen (CN)

(73) Assignee: BYD Company Limited (CN)

( * ) Notice: Subject to any disclaimer, the term of this patent is extended or adjusted under 35 U.S.C. 154(b) by 378 days.

(21) Appl. No.: 12/436,347

(22) Filed: May 6, 2009

(65) Prior Publication Data
US 2009/0302283 A1   Dec. 10, 2009

(30) Foreign Application Priority Data
Jun. 6, 2008   (CN) .............................. 200810110616

(51) Int. Cl.
*H01B 1/02*   (2006.01)
(52) U.S. Cl. ............. 252/519.1; 252/519.15; 252/521.2; 429/223; 429/231.1
(58) Field of Classification Search ................ 252/521.2, 252/519.1, 519.15; 429/223, 231.1
See application file for complete search history.

(56) References Cited

U.S. PATENT DOCUMENTS

| | | | |
|---|---|---|---|
| 3,778,307 A | 12/1973 | Beer et al. | |
| 4,394,280 A | 7/1983 | von Alpen et al. | |
| 5,879,835 A * | 3/1999 | Kawase et al. | 429/223 |
| 5,910,382 A | 6/1999 | Goodenough et al. | |
| 6,514,640 B1 | 2/2003 | Armand et al. | |
| 6,558,844 B2 | 5/2003 | Howard, Jr. et al. | |
| 6,645,452 B1 | 11/2003 | Barker et al. | |
| 6,702,961 B2 | 3/2004 | Barket et al. | |
| 6,835,500 B2 | 12/2004 | Masquelier et al. | |
| 6,960,331 B2 | 11/2005 | Barket et al. | |
| 6,964,830 B2 | 11/2005 | Takahashi | |
| 7,025,907 B2 | 4/2006 | Kohzaki et al. | |
| 7,172,834 B1 | 2/2007 | Jow et al. | |
| 7,189,475 B2 | 3/2007 | Sasaki et al. | |
| 7,255,965 B2 | 8/2007 | Xu et al. | |
| 7,261,979 B2 | 8/2007 | Gozdz et al. | |
| 7,338,734 B2 | 3/2008 | Chian et al. | |
| 7,722,848 B2 | 5/2010 | Dai et al. | |
| 7,887,721 B2 * | 2/2011 | Xiao et al. | 252/521.2 |
| 2002/0047112 A1 | 4/2002 | Hosoya et al. | |

(Continued)

FOREIGN PATENT DOCUMENTS

CN   1259773   7/2000

(Continued)

OTHER PUBLICATIONS

Related U.S. Appl. No. 12/035,978, entitled "Lithium Iron Phosphate Cathode Material," Final Office Action (mailed Dec. 7, 2009).

(Continued)

*Primary Examiner* — Khanh Tuan Nguyen
(74) *Attorney, Agent, or Firm* — Greenberg Traurig, LLP (57) ABSTRACT

Transition metal hydroxide and oxide, method of producing the same, and cathode material containing the same are disclosed. One method includes coupling an alkaline solution to a transition metal salt solution under an inert gas atmosphere, whereby the alkaline solution includes an additive. A transition metal oxide may be prepared by heating the transition metal hydroxide under an oxygen gas atmosphere. Cathode materials for lithium-ion batteries may be prepared incorporating the transition metal hydroxide and oxide embodiments disclosed herein.

18 Claims, 4 Drawing Sheets

U.S. PATENT DOCUMENTS

| | | | |
|---|---|---|---|
| 2002/0102459 | A1 | 8/2002 | Hosoya et al. |
| 2003/0170540 | A1* | 9/2003 | Ohzuku et al. ............ 429/231.1 |
| 2004/0151649 | A1 | 8/2004 | Hemmer et al. |
| 2006/0083990 | A1 | 4/2006 | Adamson et al. |
| 2006/0236528 | A1 | 10/2006 | Xu et al. |
| 2006/0257742 | A1* | 11/2006 | Kato et al. .................... 429/223 |
| 2007/0160752 | A1 | 7/2007 | Mao |
| 2007/0166609 | A1 | 7/2007 | Lee et al. |
| 2007/0178370 | A1 | 8/2007 | Amine et al. |
| 2007/0184352 | A1 | 8/2007 | Donoue et al. |
| 2007/0207080 | A1 | 9/2007 | Yang |
| 2007/0212606 | A1 | 9/2007 | Chang |
| 2009/0081102 | A1 | 3/2009 | Dai |
| 2009/0106970 | A1 | 4/2009 | Fan |
| 2009/0148765 | A1 | 6/2009 | Cao et al. |
| 2009/0169984 | A1 | 7/2009 | Liang et al. |
| 2009/0191455 | A1 | 7/2009 | Gao et al. |
| 2009/0202909 | A1* | 8/2009 | Sakamoto et al. ............ 429/223 |
| 2009/0217512 | A1 | 9/2009 | Tian et al. |
| 2009/0217513 | A1 | 9/2009 | Xi et al. |
| 2009/0220856 | A1 | 9/2009 | Tian et al. |
| 2009/0220858 | A1 | 9/2009 | Cheng |
| 2009/0220860 | A1 | 9/2009 | Xi et al. |
| 2010/0028771 | A1 | 2/2010 | Zhou et al. |
| 2010/0059706 | A1 | 3/2010 | Dai et al. |
| 2010/0062339 | A1 | 3/2010 | Pan et al. |

FOREIGN PATENT DOCUMENTS

| | | |
|---|---|---|
| CN | 1401559 | 3/2003 |
| CN | 1410349 | 4/2003 |
| CN | 1424980 | 6/2003 |
| CN | 1559889 | 1/2005 |
| CN | 1641912 | 7/2005 |
| CN | 1648036 | 8/2005 |
| CN | 1677718 | 10/2005 |
| CN | 1762798 | 4/2006 |
| CN | 1773754 | 5/2006 |
| CN | 1775665 | 5/2006 |
| CN | 1797823 | 7/2006 |
| CN | 1964125 | 5/2007 |
| CN | 1986395 | 6/2007 |
| CN | 1989649 | 6/2007 |
| CN | 101047268 | 10/2007 |
| CN | 101087021 | 12/2007 |
| CN | 101106189 | 1/2008 |
| CN | 101128950 | 2/2008 |
| CN | 101207197 | 6/2008 |
| CN | 101209827 | 7/2008 |
| CN | 101212048 | 7/2008 |
| CN | 101399343 | 4/2009 |
| CN | 101420048 | 4/2009 |
| CN | 101453019 | 6/2009 |
| CN | 101471432 | 7/2009 |
| CN | 101478041 | 7/2009 |
| CN | 101478042 | 7/2009 |
| CN | 101494305 | 7/2009 |
| EP | 1553647 | 7/2005 |
| EP | 1855334 | 11/2007 |
| WO | 9740541 | 10/1997 |
| WO | 2005076936 | 8/2005 |
| WO | WO 2006/011430 A1 * | 2/2006 |
| WO | 2006066470 | 6/2006 |
| WO | 2006112674 | 10/2006 |
| WO | WO 2007/048283 * | 5/2007 |
| WO | 2008109734 | 9/2008 |

OTHER PUBLICATIONS

USPTO Transaction History of related U.S. Appl. No. 12/035,978, filed Feb. 22, 2008, entitled "Lithium Iron Phosphate Cathode Material."

USPTO Transaction History of related U.S. Appl. No. 12/040,773, filed Feb. 29, 2008, entitled "Composite Compound with Mixed Crystalline Structure."

USPTO Transaction History of related U.S. Appl. No. 12/053,308, filed Mar. 21, 2008, entitled "Cathode Materials for Lithium Batteries."

USPTO Transaction History of related U.S. Appl. No. 12/127,431, filed May 27, 2008, entitled "Lithium Iron Phosphate Cathode Material."

USPTO Transaction History of related U.S. Appl. No. 12/198,087, filed Aug. 25, 2008, entitled "Lithium-Ion Rechargeable Battery Preparation."

USPTO Transaction History of related U.S. Appl. No. 12/254,537, filed Oct. 20, 2008, entitled "Lithium Iron(II) Phosphate Cathode Active Material."

USPTO Transaction History of related U.S. Appl. No. 12/273,649, filed Nov. 19, 2008, entitled "Composite Separator Films for Lithium-Ion Batteries."

USPTO Transaction History of related U.S. Appl. No. 12/316,165, filed Dec. 9, 2008, entitled "Composite Compound with Mixed Crystalline Structure."

USPTO Transaction History of related U.S. Appl. No. 12/316,173, filed Dec. 9, 2008, entitled "Composite Compound with Mixed Crystalline Structure."

USPTO Transaction History of related U.S. Appl. No. 12/316,180, filed Dec. 9, 2008, entitled "Composite Compound with Mixed Crystalline Structure."

USPTO Transaction History of related U.S. Appl. No. 12/316,234, filed Dec. 9, 2008, entitled "Composite Compound with Mixed Crystalline Structure."

USPTO Transaction History of related U.S. Appl. No. 12/352,981, filed Jan. 13, 2009, entitled "Electrolyte for Batteries and Battery Packs."

USPTO Transaction History of related U.S. Appl. No. 12/482,690, filed Jun. 11, 2009, entitled "Electrolyte for Lithium Batteries."

European Search Report for EP09400001 (mailed Apr. 14, 2009).

Hu, Huan-yu et al., "Influenece of the Mg-substitution on electrochemical performances of LiFePO4," China Academic Journal Electronic Publishing House, pp. 18-20, vol. 30, No. 1, 2006.

International Patent Application Serial No. PCT/CN08/70391, International Search Report and Written Opinion (mailed Jul. 17, 2008).

Pei, Su-hua et al., "Sensitivity of $TiO^2$: NB2O5 composite crystalliod to trimethylamine", Journal of Functional Materials and Devices, vol. 12, No. 3, Jun. 2006.

Related U.S. Appl. No. 12/035,978, entitled "Lithium Iron Phosphate Cathode Material ," Non-Final Office Action (mailed Apr. 27, 2009).

Related U.S. Appl. No. 12/035,978, entitled "Lithium Iron Phosphate Cathode Material ," Non-Final Office Action (mailed Oct. 2, 2008).

Related U.S. Appl. No. 12/035,978, entitled "Lithium Iron Phosphate Cathode Material," Final Office Action (mailed Jan. 9, 2009).

Related U.S. Appl. No. 12/127,431, entitled "Lithium Iron-Phosphate Cathode Material," Final Office Action (mailed Jun. 26, 2009).

Related U.S. Appl. No. 12/127,431, entitled "Lithium Iron-Phosphate Cathode Material," Non-Final Office Action (mailed Jan. 30, 2009).

Yun et al., "Synthesis and electrochemcial properties of olivine-type LiFe PO4/C composite cathode material prepared from a poly(vinyl alcohol)-containg precursor." Journal of Power Sources vol. 160, issue 2, Oct. 2006, pp. 1361-1368 (Available online May 9, 2006).

Related U.S. Appl. No. 12/127,431, entitled "Lithium Iron-Phosphate Cathode Material," Non-Final Office Action (mailed Oct. 20, 2009).

* cited by examiner

TRANSITION METAL HYDROXIDE AND OXIDE, METHOD OF PRODUCING THE SAME, AND CATHODE MATERIAL CONTAINTING THE SAME

CROSS-REFERENCE TO RELATED APPLICATION

This application claims priority to Chinese Patent Application No. 200810110616.9, filed Jun. 6, 2008.

BACKGROUND

Lithium secondary batteries are widely used in various mobile electronic devices because of high energy density, long battery life and minimized pollution, among other factors. The electrochemical properties of lithium secondary batteries may be dependent on the type of material used for electrodes and electrolyte. Layered and spherical cathode mixed materials (e.g., $LiNi_{0.5}Mn_{0.5}O_2$, $LiNi_{0.8}CO_{0.2}O_2$, $LiNi_{1/3}CO_{1/3}Mn_{1/3}O_2$) may be incorporated in the lithium secondary batteries because of lowered costs and enhanced electrical properties. The methods of preparing such materials include solid phase and co-precipitation techniques. In some instances, the particle size and morphology may be difficult to maintain using the solid phase technique while the tap density may be too low using the co-precipitation technique.

SUMMARY

One embodiment discloses a transition metal hydroxide having a transition metal salt substance coupled to an alkaline substance under an inert gas atmosphere. In this instance, the alkaline substance includes an additive. The hydroxide has pH values of from about 8 to about 12. In one embodiment, the transition metal salt substance includes an ascorbic acid, where the ascorbic acid has a concentration of about 0.01 mol/L to about 0.5 mol/L. In another embodiment, the transition metal salt substance includes a transition metal salt solute, where the transition metal salt solute includes at least one of salts of nickel, manganese and cobalt. In some embodiments, the transition metal salt substance has a concentration of about 0.6 mol/L to about 3 mol/L.

In one embodiment, the alkaline substance includes an alkali. In one instance, the alkali includes at least one of lithium hydroxide, sodium hydroxide and potassium hydroxide. In some embodiments, the alkali has a concentration of about 1 mol/L to about 6 mol/L. In another embodiment, the alkaline substance includes ammonia, whereby the molar ratio of the alkali to the ammonia ranges from about 1-10:1. In one embodiment, the additive includes at least one of sodium hyposulfite, sodium sulfite and hydrazine hydrate.

In another embodiment, the additive includes sodium hyposulfite and at least one of sodium sulfite and hydrazine hydrate, whereby the sodium hyposulfite is about 50 weight percent to about 95 weight percent of the additive. In some embodiments, the additive has a concentration of about 0.1 mol/L to about 3 mol/L.

One embodiment discloses a method of coupling an alkaline solution to a transition metal salt solution to produce a mixed solution. In one instance, the coupling occurs under an inert gas atmosphere, the alkaline solution includes an additive, and the mixed solution includes a transition metal hydroxide. In one embodiment, the coupling includes continuous contacting of a liquid form of the alkaline solution to a liquid form of the transition metal salt solution. In some embodiments, the coupling includes maintaining pH values of the mixed solution at from about 8 to about 12. In other embodiments, the coupling occurs at temperatures of about 20° C. to about 80° C. for periods of about 8 hours to about 20 hours.

One embodiment discloses a method of coupling an alkaline solution to a transition metal salt solution to produce a mixed solution. In one instance, the coupling occurs under an inert gas atmosphere, the alkaline solution includes an additive, and the mixed solution includes a transition metal hydroxide. In one instance, the transition metal hydroxide can be heated under an oxygen gas atmosphere to produce a transition metal oxide. In some embodiments, the heating occurs at temperature of about 300° C. to about 800° C. for periods of about 3 hours to about 8 hours.

One method of producing a cathode material comprises coupling a lithium compound to at least one of transition metal hydroxide and transition metal oxide. In this instance, the transition metal hydroxide and the transition metal oxide may be prepared using the methods described herein. In one embodiment, the lithium compound includes at least one of lithium carbonate, lithium nitrate, lithium hydroxide, lithium hydroxide monohydrate, lithium oxalate and lithium acetate. In some embodiments, the coupling occurs at temperatures of about 800° C. to about 1000° C. for periods of about 8 hours to about 24 hours.

Other variations, embodiments and features of the present disclosure will become evident from the following detailed description, drawings and claims.

DETAILED DESCRIPTION

It will be appreciated by those of ordinary skill in the art that the embodiments disclosed herein can be embodied in other specific forms without departing from the spirit or essential character thereof. The presently disclosed embodiments are therefore considered in all respects to be illustrative and not restrictive.

One embodiment discloses a method of producing a transition metal hydroxide by coupling a transition metal salt substance and an alkaline substance in an inert gas atmosphere. In one embodiment, the alkaline substance includes an additive. In some embodiments, the additive includes at least one of sodium hyposulfite, sodium sulfite and hydrazine hydrate, among others. In one embodiment, the coupling includes physical contacting or physical mixing of the substances, among others. In other embodiments, the transition metal salt and alkaline substances may come in other forms including without limitation solution, compound and mixture.

In one embodiment, a transition metal hydroxide can be produced by contacting a transition metal salt solution with an alkaline solution in an inert gas atmosphere. In one instance, the transition metal salt solution is a soluble solution. In one embodiment, the alkaline solution includes an additive. The additive includes, for example, at least one of sodium hyposulfite, sodium sulfite and hydrazine hydrate, among others.

In one instance, the contacting step includes direct physical touching of the transition metal salt solution and the alkaline solution to produce a mixed solution. In other instances, the contacting step includes continuous contacting (e.g., dripping, dropping, flowing) of the two solutions in liquid form to produce a mixed solution. For example, a first liquid may be continuously dripped into a second liquid, or vice versa. In one embodiment, the first liquid is the transition metal salt solution and the second liquid is the alkaline solution. In another embodiment, the first liquid is the alkaline solution and the second liquid is the transition metal salt solution. In another example, the two liquids are continuously dripped into a mixed solution. In one embodiment, the mixed solution includes transition metal hydroxide. In another embodiment, the continuous contacting technique may be beneficial in controlling a pH value of the mixed solution.

In some embodiments, the transition metal salt solution and the alkaline solution are mixed in suitable amounts to provide a mixed solution having pH values of from about 8 to about 12. In other embodiments, the pH values of the mixed solution can be controlled to be from about 9 to about 11. For example, the mixed solution may have pH value of about 8, or about 9, or about 10, or about 11, or about 12. In some embodiments, the pH values of the mixed solution may be constant throughout the contacting or mixing process and range from about 8 to about 12.

In one embodiment, the contacting step includes continuous contacting whereby the pH value of the mixed solution may be controlled by regulating the speed in which the two liquids are brought together. In other words, the speed in which the transition metal salt solution and the alkaline solution, both in liquid form, are flowing. In one embodiment, the speed of the transition metal salt solution is fixed while the speed of the alkaline solution is varied to control a pH value of the mixed solution. In another embodiment, the speed of the alkaline solution is fixed and the speed of the transition metal salt solution is varied to control a pH value of the mixed solution. In some embodiments, the transition metal salt solution is stationary and the alkaline solution is flowing for controlling the pH value, or vice versa. In other embodiments, both speeds of the transition metal salt solution and the alkaline solution may be jointly fixed or jointly varied to control the pH values of the mixed solution.

In some embodiments, the contacting step occurs at temperatures ranging from about 20° C. to about 80° C. In other embodiments, the contacting step occurs at temperatures ranging from about 40° C. to about 60° C. In some embodiments, the contacting step occurs at periods ranging from about 8 to about 20 hours. In other embodiments, the contacting step occurs at periods ranging from about 12 to about 15 hours. As used herein, "periods" include the total time from beginning of the contacting step to the termination of the chemical reaction between the transition metal salt solution and the alkaline solution. In some embodiments, the mixed solution may be maintained for an additional time period of about 0.5 hour to about 6 hours after the contacting step to allow further chemical reactions of the two solutions. In other words, after the alkaline solution has continuously contacted the transition metal salt solution, the mixture may be allowed to stand for the additional time period to allow further chemical reaction to take place.

In one embodiment, the alkaline solution includes an additive. In one embodiment, the additive includes at least one of sodium hyposulfite, sodium sulfite and hydrazine hydrate, among others. In another embodiment, the additive includes a mixture of sodium hyposulfite and at least one of sodium sulfite and hydrazine hydrate. In this instance, the amount of sodium hyposulfite may be about 50 weight percent to about 95 weight percent of the additive. In some embodiments, the concentration of the additive within the alkaline solution can range from about 0.1 mol/L to about 3 mol/L. In other embodiments, the concentration of the additive within the alkaline solution can range from about 0.5 mol/L to about 2 mol/L. In other embodiments, the concentration of the additive within the transition metal hydroxide can range from about 0.1 mol/L to about 3 mol/L.

In one embodiment, the transition metal salt solution includes a transition metal salt. In one example, the concentration of the transition metal salt within the transition metal salt solution can range from about 0.6 mol/L to about 3.0 mol/L. In other embodiments, the concentration of the transition metal salt within the transition metal salt solution can range from about 1 mol/L to about 2 mol/L. In some embodiments, the concentration of the transition metal salt within the transition metal hydroxide can range from about 1 mol/L to about 2 mol/L.

In some embodiments, the transition metal salt solution includes a transition metal salt solute. In one embodiment, the transition metal salt solute includes at least one of salts of nickel, manganese and cobalt, among others. In some embodiments, the salts of nickel, manganese and cobalt may also include chlorate, sulfate, nitrate of nickel, manganese and cobalt, among others. In some instances, the salts are soluble.

In one embodiment, the transition metal salt solution includes ascorbic acid. In one embodiment, the ascorbic acid has concentrations of from about 0.01 mol/L to about 0.5 mol/L in the transition metal salt solution. In other embodiments, the concentration of the ascorbic acid within the transition metal salt solution is from about 0.1 mol/L to about 0.3 mol/L. In some embodiments, the concentration of the ascorbic acid within the transition metal hydroxide is from about 0.01 mol/L to about 0.5 mol/L.

In one embodiment, the alkaline solution includes an alkali. In one embodiment, the alkali in the alkaline solution includes at least one of lithium hydroxide, sodium hydroxide and potassium hydroxide, among others. In one example, the concentration of the alkali within the alkaline solution can range from about 1 mol/L to about 6 mol/L. In other embodiments, the concentration of the alkali within the alkaline solution can range from about 2 mol/L to about 4 mol/L. In one embodiment, the concentration of the alkali within the transition metal hydroxide can range from about 1 mol/L to about 6 mol/L. In some embodiments, the alkaline solution includes ammonia, whereby the molar ratio of the alkali to the ammonia may be about 1-10:1.

As discussed above, the contacting step may be performed under an inert gas atmosphere. In some instances, the inert gas includes at least one of nitrogen, argon, neon, xenon, among others.

In general, methods of producing a transition metal hydroxide include:

(1) Preparing a transition metal salt solution by weighing an amount of transition metal salt, selectively add an amount of ascorbic acid, and incorporate deionized water to produce a soluble solution.

(2) Preparing an alkaline solution by weighing an amount of soluble alkali, selectively add amounts of ammonia and additive, and incorporate deionized water to produce a solution.

(3) Adding the transition metal salt solution of (1) at a first velocity to a reactor under an inert gas atmosphere, and adding the alkaline solution of (2) at a second drop velocity (e.g., dripping speed of the solution) to the reactor to produce a mixture. The pH value of the reactor system may be detected by a pH controller. The second drop velocity of the alkaline solution may be maintained to keep the pH value of the reactor system at about 10 or some other value (e.g., pH values of from about 8 to about 12). The mixture may be maintained at a constant temperature for a first period. After completion of the reaction, the mixture is allowed to stand and de-mixed by removing the supernatant fluid, washing the residue with deionized water, and filtering to obtain a solid matter. The solid matter may subsequently be placed in an oven and dried to produce the transition metal hydroxide.

In one embodiment, the transition metal hydroxide may be heated under an oxygen atmosphere to produce a transition metal oxide. In other embodiments, the transition metal hydroxide may be calcined. In some embodiments, the oxygen atmosphere may be provided by providing air or oxygen gas into a reactor system. Within the atmosphere, the transition metal hydroxide may be calcined or oxidized to the transition metal oxide. In some instances, the at least one of heating and calcining steps occurs at temperatures of about 300° C. to about 800° C. for periods of about 3 hours to about 8 hours. In other instances, the at least one of heating and calcining steps occurs at temperatures of about 400° C. to about 700° C. for periods of about 5 hours to about 7 hours.

In one embodiment, a cathode material for lithium-ion batteries may be produced by heating or calcining a mixture of lithium compounds and at least one of transition metal hydroxide and transition metal oxide. In some embodiments, the transition metal hydroxide and transition metal oxide are prepared using the methods as described herein. In other embodiments, the lithium compound includes at least one of lithium carbonate, lithium nitrate, lithium hydroxide, lithium hydroxide monohydrate, lithium oxalate and lithium acetate, among others. In some embodiments, the heating or calcining step occurs at temperatures of about 800° C. to about 1000° C. for periods of about 8 hours to about 24 hours. In other embodiments, the heating or calcining step occurs at temperatures of about 850° C. to about 950° C. for about 15 hours to about 20 hours.

EXAMPLE 1

(1) Prepare a transition metal salt solution having 0.5 mol/L nickel sulfate, 0.5 mol/L manganese sulfate, and 0.01 mol/L ascorbic acid.

(2) Prepare an alkaline solution having 2.0 mol/L NaOH, 0.4 mol/L ammonia, 0.2 mol/L sodium thiosulfate, and 0.1 mol/L sodium sulfite.

(3) Add the salt solution of (1) to a reactor at 25 mL/min using a peristaltic pump under an argon atmosphere. Add the alkaline solution of (2) to the reactor in drops using a peristaltic pump, the dropping speed of the alkaline solution controlled to keep the pH value of the reactor system at about 10. The pH value of the reactor system can be detected by a pH controller. Keep the reaction mixture at about 30° C. and feed for about 12 hours. Continue the reaction for about 3 hours with a total reaction time of about 15 hours. Subsequently, stand and de-mix the reaction solution. Remove the supernatant fluid and wash the residue with deionized water, and filter to obtain a solid matter. Dry the solid matter in an oven at about 120° C. for about 4 hours to produce a spheric $Ni_{0.5}Mn_{0.5}(OH)_2$ compound.

EXAMPLE 2

Heat the $Ni_{0.5}Mn_{0.5}(OH)_2$ compound of EXAMPLE 1 in a calciner at about 600° C. for about 5 hours to produce a $Ni_{0.5}Mn_{0.5}O_{1.5}$ compound.

EXAMPLE 3

(1) Prepare a transition metal salt solution having 0.5 mol/L nickel sulfate, 0.5 mol/L manganese sulfate, 0.5 mol/L cobalt sulfate, and 0.3 mol/L ascorbic acid.

(2) Prepare an alkaline solution having 3.0 mol/L KOH, 3.0 mol/L ammonia, and 1.5 mol/L sodium sulfite.

(3) Add the salt solution of (1) to a reactor at 25 mL/min using a peristaltic pump under an argon atmosphere. Add the alkaline solution of (2) to the reactor in drops using a peristaltic pump, the dropping speed of the alkaline solution controlled to keep the pH value of the reactor system at about 11. The pH value of the reactor system can be detected by a pH controller. Keep the reaction mixture at about 40° C. and feed for about 10 hours. Continue the reaction for about 2 hours with a total reaction time of about 12 hours. Subsequently, stand and de-mix the reaction solution. Remove the supernatant fluid and wash the residue with deionized water, and filter to obtain a solid matter. Dry the solid matter in an oven at about 120° C. for about 4 hours to produce a spheric $Ni_{1/3}CO_{1/3}Mn_{1/3}(OH)_2$ compound.

EXAMPLE 4

Heat the $Ni_{1/3}CO_{1/3}Mn_{1/3}(OH)_2$ compound of EXAMPLE 3 in a calciner at about 800° C. for about 5 hours to produce a $Ni_{1/3}CO_{1/3}Mn_{1/3}O_{4/3}$ compound.

EXAMPLE 5

(1) Prepare a transition metal salt solution having 0.6 mol/L manganese sulfate.

(2) Prepare an alkaline solution having 1.0 mol/L NaOH, 1.0 mol/L ammonia, and 0.5 mol/L sodium thiosulfate.

(3) Add the salt solution of (1) to a reactor at 25 mL/min using a peristaltic pump under an argon atmosphere. Add the alkaline solution of (2) to the reactor in drops using a peristaltic pump, the dropping speed of the alkaline solution controlled to keep the pH value of the reactor system at about 12. The pH value of the reactor system can be detected by a pH controller. Keep the reaction mixture at about 60° C. and feed for about 7 hours. Continue the reaction for about 1 hour with a total reaction time of about 8 hours. Subsequently, stand and de-mix the reaction solution. Remove the supernatant fluid and wash the residue with deionized water, and filter to obtain a solid matter. Dry the solid matter in an oven at about 120° C. for about 4 hours to produce a spheric $Mn(OH)_2$ compound.

EXAMPLE 6

Heat the Mn(OH)$_2$ compound of EXAMPLE 5 in a calciner at about 400° C. for about 3 hours to produce a Mn$_2$O$_3$ compound.

EXAMPLE 7

The sample is substantially similar in all respect to that of EXAMPLE 5 with the exception that 0.03 mol/L ascorbic acid is added while preparing the transition metal salt solution.

EXAMPLE 8

The sample is substantially similar in all respect to that of EXAMPLE 5 with the exception that 0.3 mol/L sodium thiosulfate and 0.2 mol/L hydrazine hydrate are added instead of the 0.5 mol/L sodium thiosulfate while preparing the alkaline solution.

EXAMPLE 9

(1) Prepare a transition metal salt solution having 2.4 mol/L nickel sulfate, 0.6 mol/L cobalt sulfate, and 0.5 mol/L ascorbic acid.

(2) Prepare an alkaline solution having 6.0 mol/L NaOH, 2.7 mol/L sodium sulfite, and 0.1 mol/L hydrazine hydrate.

(3) Add the salt solution of (1) to a reactor at 25 mL/min using a peristaltic pump under an argon atmosphere. Add the alkaline solution of (2) to the reactor in drops using a peristaltic pump, the dropping speed of the alkaline solution controlled to keep the pH value of the reactor system at about 8. The pH value of the reactor system can be detected by a pH controller. Keep the reaction mixture at about 25° C. and feed for about 15 hours. Continue the reaction for about 5 hours with a total reaction time of about 20 hours. Subsequently, stand and de-mix the reaction solution. Remove the supernatant fluid and wash the residue with deionized water, and filter to obtain a solid matter. Dry the solid matter in an oven at about 120° C. for about 4 hours to produce a spheric Ni$_{0.8}$CO$_{0.2}$(OH)$_2$ compound.

EXAMPLE 10

Heat the Ni$_{0.8}$CO$_{0.2}$(OH)$_2$ compound of EXAMPLE 9 in a calciner at about 700° C. for about 8 hours to produce a Ni$_{0.8}$CO$_{0.2}$O$_{1.5}$ compound.

EXAMPLE 11

Mix 90.81 grams of the Ni$_{0.5}$Mn$_{0.5}$(OH)$_2$ compound of EXAMPLE 1 and 45.32 grams of LiOH to produce a mixture. Heat the mixture in a calciner at about 900° C. for about 20 hours to produce a LiNi$_{0.5}$Mn$_{0.5}$O$_2$ cathode material (labeled as S1).

EXAMPLE 12

Mix 80.80 grams of the Ni$_{0.5}$Mn$_{0.5}$O$_{1.5}$ compound of EXAMPLE 2 and 45.32 grams of LiOH to produce a mixture. Heat the mixture in a calciner at about 900° C. for about 20 hours to produce a LiNi$_{0.5}$Mn$_{0.5}$O$_2$ cathode material (labeled as S2).

EXAMPLE 13

Mix 91.48 grams of the Ni$_{1/3}$CO$_{1/3}$Mn$_{1/3}$(OH)$_2$ compound of EXAMPLE 3 and 44.06 grams of LiOH to produce a mixture. Heat the mixture in a calciner at about 800° C. for about 15 hours to produce a LiNi$_{1/3}$CO$_{1/3}$Mn$_{1/3}$O$_2$ cathode material.

EXAMPLE 14

Mix 80.80 grams of the Ni$_{1/3}$CO$_{1/3}$Mn$_{1/3}$O$_{4/3}$ compound of EXAMPLE 4 and 44.06 grams of LiOH to produce a mixture. Heat the mixture in a calciner at about 800° C. for about 15 hours to produce a LiNi$_{1/3}$CO$_{1/3}$Mn$_{1/3}$O$_2$ cathode material.

EXAMPLE 15-17

Mix 61.47 grams of the Mn(OH)$_2$ compounds of each of EXAMPLES 5, 7 and 8, and 44.06 grams of LiOH to produce three mixtures, respectively. Heat each mixture in a calciner at about 800° C. for about 15 hours to produce three LiMnO$_2$ cathode materials, respectively.

EXAMPLE 18

Mix 78.94 grams of the Mn$_2$O$_3$ compound of EXAMPLE 6 and 21.82 grams of LiOH to produce a mixture. Heat the mixture in a calciner at about 800° C. for about 15 hours to produce a LiMnO$_2$ cathode material.

EXAMPLE 19

Mix 92.74 grams of the Ni$_{0.8}$CO$_{0.2}$(OH)$_2$ compound of EXAMPLE 9 and 38.05 grams of Li$_2$CO$_3$ to produce a mixture. Heat the mixture in a calciner at about 750° C. for about 15 hours to produce a LiNi$_{0.8}$CO$_{0.2}$O$_2$ cathode material.

EXAMPLE 20

Mix 82.74 grams of the Ni$_{0.8}$CO$_{0.2}$O$_{1.5}$ compound of EXAMPLE 10 and 38.05 grams of Li$_2$CO$_3$ to produce a mixture. Heat the mixture in a calciner at about 750° C. for about 15 hours to produce a LiNi$_{0.8}$CO$_{0.2}$O$_2$ cathode material.

Reference 1

The sample is substantially similar in all respect to that of EXAMPLE 9 with the exception that no sodium sulfite is added while preparing the alkaline solution.

Reference 2

Mix 92.74 grams of the Ni$_{0.8}$CO$_{0.2}$(OH)$_2$ compound of REFERENCE 1 and 38.05 grams of Li$_2$CO$_3$ to produce a mixture. Heat the mixture in a calciner at about 750° C. for about 15 hours to produce a LiNi$_{0.8}$CO$_{0.2}$O$_2$ cathode material.

TESTING

Figure 1:
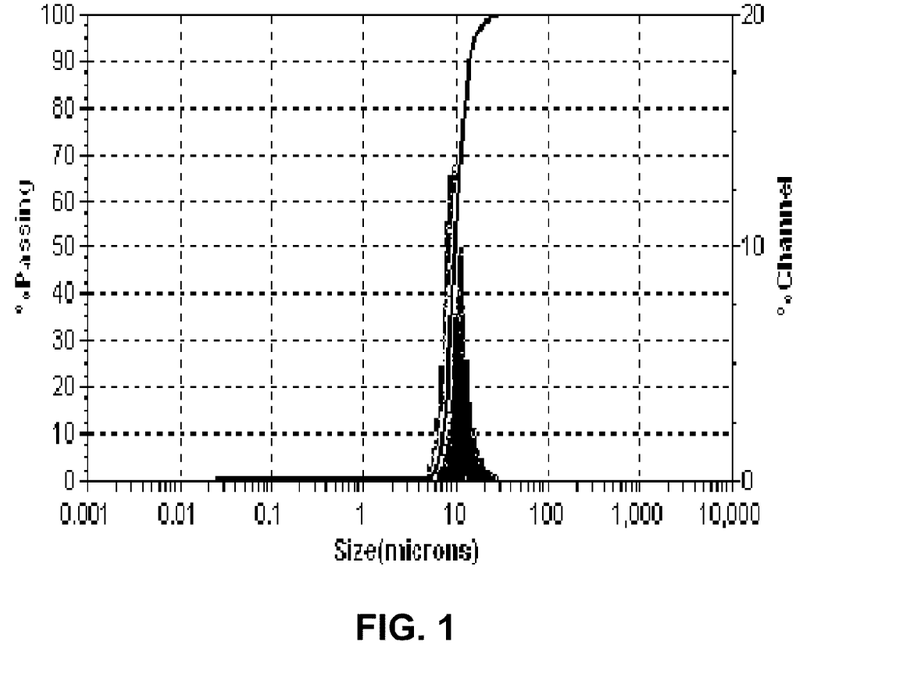
FIG. 1 is a particle size distribution map of EXAMPLE 1.
Figure 2:
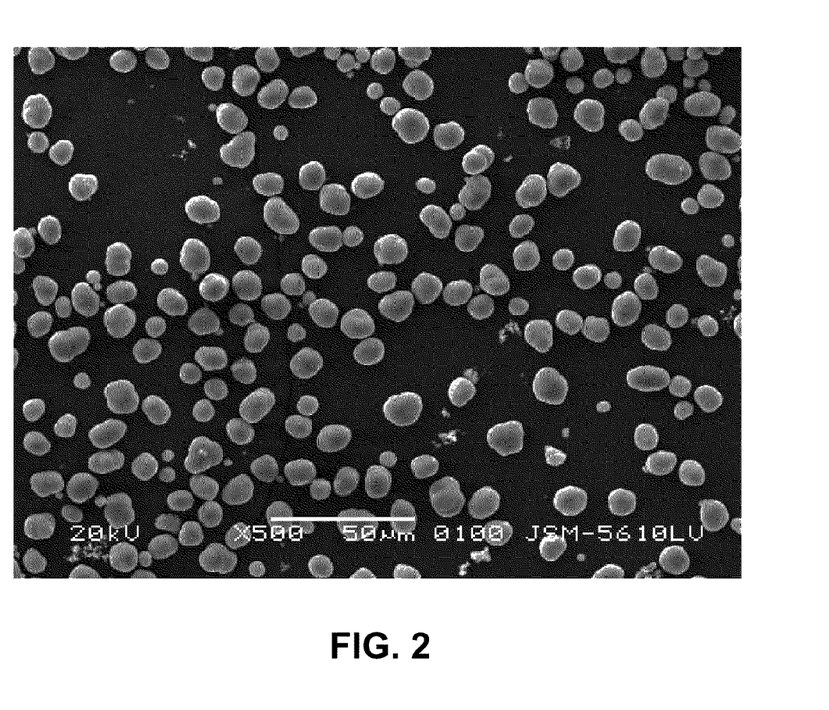
FIG. 2 is a scanning electron microscope image of EXAMPLE 1.
Figure 3:
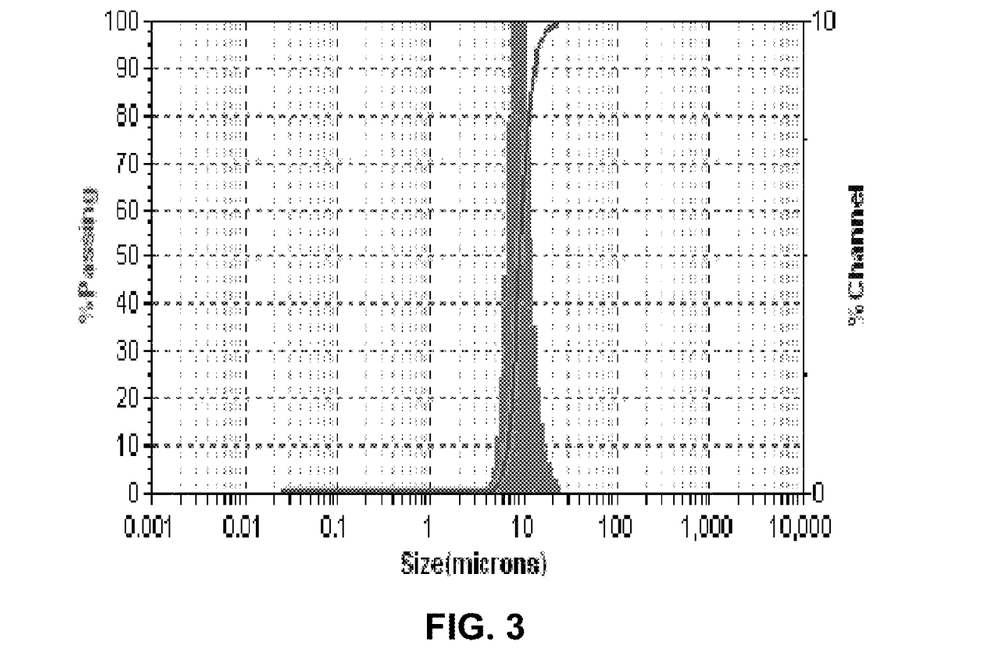
FIG. 3 is a particle size distribution map of EXAMPLE 2.
Figure 4:
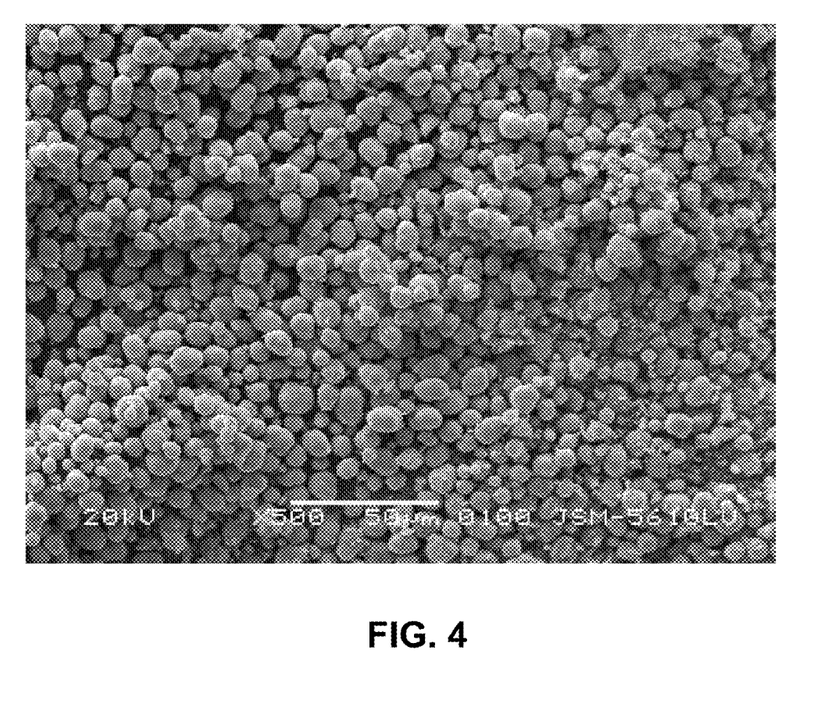
FIG. 4 is a scanning electron microscope image of EXAMPLE 2.
Figure 5:
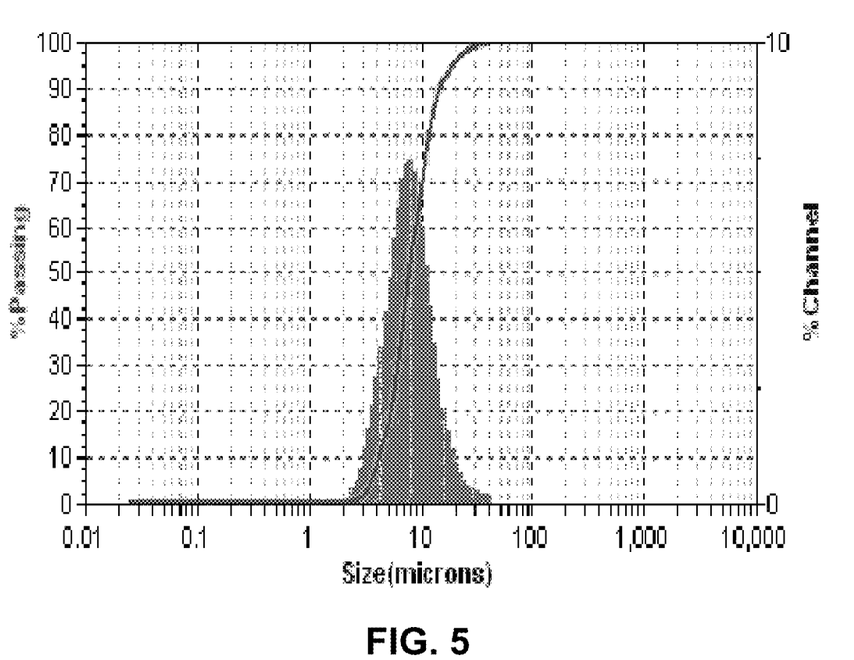
FIG. 5 is a particle size distribution map of EXAMPLE 11.
Figure 6:
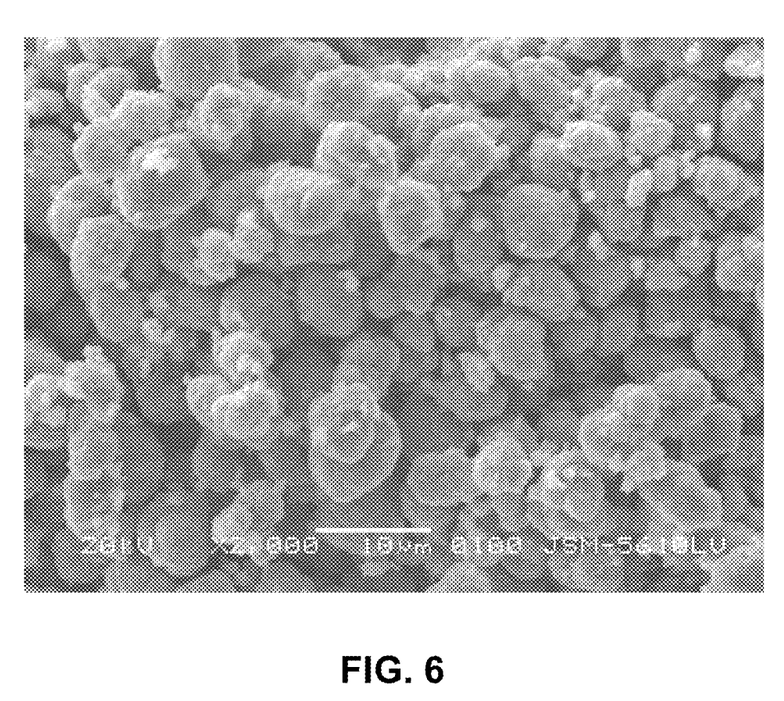
FIG. 6 is a scanning electron microscope image of EXAMPLE 11.
Figure 7:
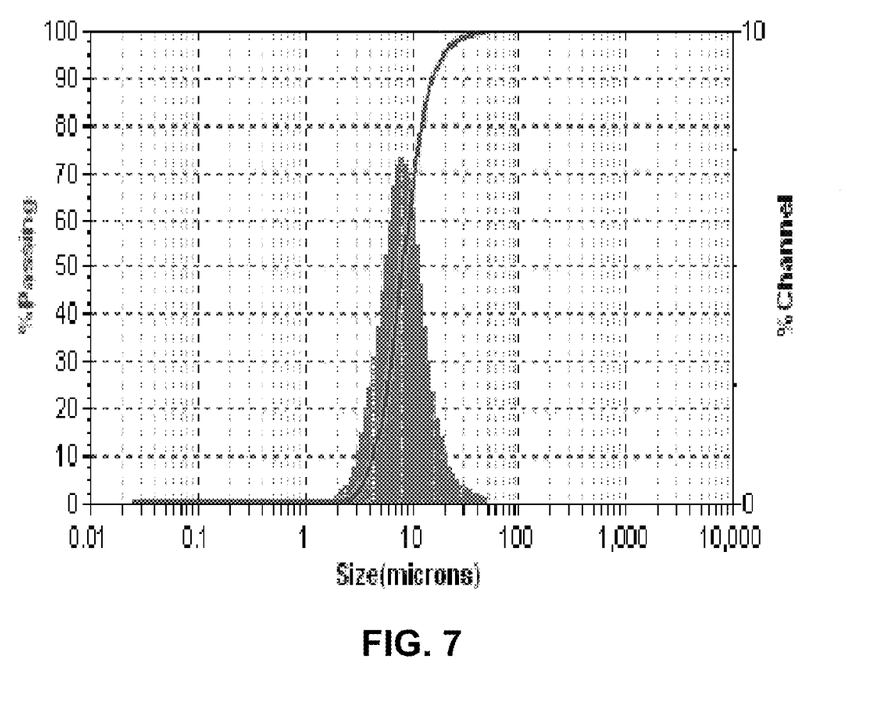
FIG. 7 is a particle size distribution map of EXAMPLE 12.
Figure 8:
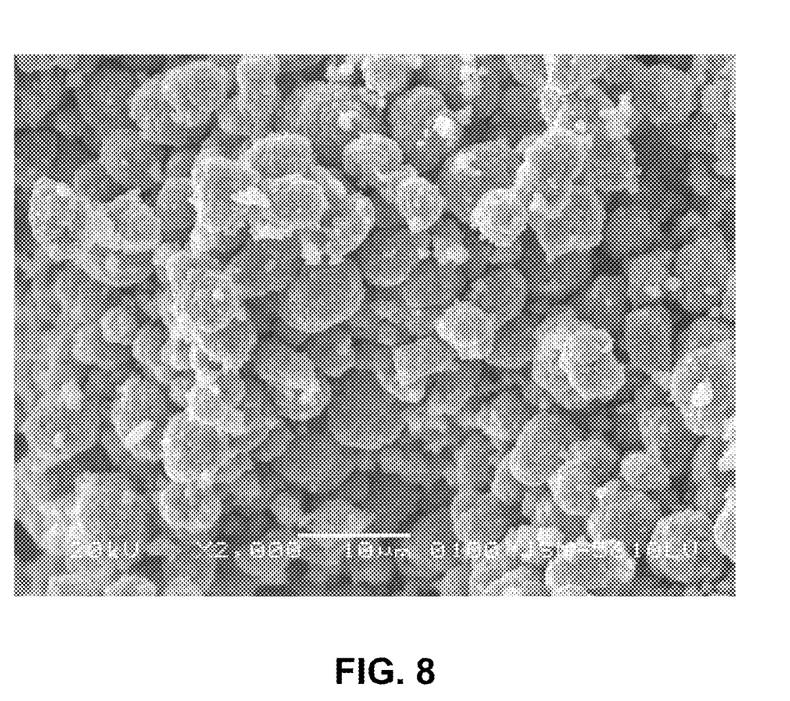
FIG. 8 is a scanning electron microscope image of EXAMPLE 12.

A particle size analyzer (PSA/Honeywell/US) can be used to analyze granularity of the resulting materials from the examples and the references disclosed herein. Accordingly, EXAMPLES 1, 2, 12 and 13 have been analyzed and the results are shown on FIGS. 1, 3, 5 and 7, respectively. A scanning electron microscope (SEM/JSM-5600/JEOL) can be used for imaging the resulting materials from the examples and the references disclosed herein. Accordingly, EXAMPLES 1, 2, 12 and 13 have been analyzed and the results are shown on FIGS. 2, 4, 6 and 8, respectively. A tap density analyzer (PF-300B/LiTian/China) can be used to analyze the tap density of the resulting materials from the examples and the references disclosed herein. Accordingly, the tap densities of EXAMPLES 1-20 and REFERENCES 1-2 are measured and recorded in Table 1.

TABLE 1

Tap Density of EXAMPLES 1-20 and REFERENCES 1-2

| Transition Metal Hydroxide or Oxide | Tap Density (g/cm$^3$) | Cathode Material | Tap Density (g/cm$^3$) |
| --- | --- | --- | --- |
| EXAMPLE 1 | 1.5 | EXAMPLE 11 | 2.6 |
| EXAMPLE 2 | 2.4 | EXAMPLE 12 | 2.7 |
| EXAMPLE 3 | 1.7 | EXAMPLE 13 | 2.8 |
| EXAMPLE 4 | 2.8 | EXAMPLE 14 | 3.0 |
| EXAMPLE 5 | 1.2 | EXAMPLE 15 | 2.1 |
| EXAMPLE 6 | 2.1 | EXAMPLE 16 | 2.5 |
| EXAMPLE 7 | 1.5 | EXAMPLE 17 | 2.4 |
| EXAMPLE 8 | 1.4 | EXAMPLE 18 | 2.6 |
| EXAMPLE 9 | 1.6 | EXAMPLE 19 | 2.7 |
| REFERENCE 1 | 0.9 | REFERENCE 2 | 1.6 |
| EXAMPLE 10 | 2.7 | EXAMPLE 20 | 2.8 |

Based on the results of Table 1, under the same condition, the transition metal hydroxides made by the methods of examples have better tap density (2.7 g/cm$^3$) than which made by the methods of reference (1.6 g/cm$^3$); the cathode materials made by the methods of examples further have better tap density (2.8 g/cm$^3$). Then, as prepared by the method of the examples, the transition metal hydroxide or oxide could enhance the tap density of cathode material.

Although the present disclosure has been described in detail with reference to several embodiments, additional variations and modifications exist within the scope and spirit as described and defined in the following claims.

What is claimed is:

1. A transition metal hydroxide comprising:
    a transition metal salt substance;
    an alkaline substance coupled to the transition metal salt substance under an inert gas atmosphere, wherein the alkaline substance comprises an additive, wherein the additive comprises sodium hyposulfite and at least one of sodium sulfite and hydrazine hydrate, and wherein the sodium hyposulfite is about 50 weight percent to about 95 weight percent of the additive.

2. The hydroxide of claim 1 having pH values of from about 8 to about 12.

3. The hydroxide of claim 1, wherein the transition metal salt substance further comprises an ascorbic acid, and wherein the ascorbic acid has a concentration ranging from about 0.01 mol/L to about 0.5 mol/L.

4. The hydroxide of claim 1, wherein the transition metal salt substance further comprises a transition metal salt solute, and wherein the transition metal salt solute comprises at least one of salts of nickel, manganese and cobalt.

5. The hydroxide of claim 1, wherein transition metal salt substance has a concentration ranging from about 0.6 mol/L to about 3 mol/L.

6. The hydroxide of claim 1, wherein the alkaline substance further comprises an alkali, and wherein the alkali comprises at least one of lithium hydroxide, sodium hydroxide and potassium hydroxide.

7. The hydroxide of claim 6, wherein the alkali has a concentration ranging from about 1 mol/L to about 6 mol/L.

8. The hydroxide of claim 6, wherein the alkaline substance further comprises ammonia, wherein the molar ratio of the alkali to the ammonia ranges from about 1-10:1.

9. The hydroxide of claim 1, wherein the additive has a concentration ranging from about 0.1 mol/L to about 3 mol/L.

10. A method comprising:
    coupling an alkaline solution to a transition metal salt solution to produce a mixed solution, wherein the coupling occurs under an inert gas atmosphere, wherein the alkaline solution comprises an additive, wherein the additive comprises sodium hyposulfite and at least one of sodium sulfite and hydrazine hydrate, and wherein the sodium hyposulfite is about 50 weight percent to about 95 weight percent of the additive, and wherein the mixed solution comprises a transition metal hydroxide.

11. The method of claim 10, wherein the coupling comprises continuous contacting of a liquid form of the alkaline solution to a liquid form of the transition metal salt solution.

12. The method of claim 10, wherein the coupling includes maintaining pH values of the mixed solution at from about 8 to about 12.

13. The method of claim 10, wherein the coupling occurs at temperatures of about 20° C. to about 80° C. for periods of about 8 hours to about 20 hours.

14. A method comprising:
    coupling an alkaline solution to a transition metal salt solution to produce a mixed solution, wherein the coupling occurs under an inert gas atmosphere, wherein the alkaline solution comprises an additive, wherein the additive comprises sodium hyposulfite and at least one of sodium sulfite and hydrazine hydrate, and wherein the sodium hyposulfite is about 50 weight percent to about 95 weight percent of the additive, and wherein the mixed solution comprises a transition metal hydroxide; and
    heating the transition metal hydroxide under an oxygen gas atmosphere to produce a transition metal oxide.

15. The method of claim 14, wherein the heating occurs at temperature of about 300° C. to about 800° C. for periods of about 3 hours to about 8 hours.

16. The method of producing a cathode material comprising coupling a lithium compound to at least one of transition metal hydroxide and transition metal oxide, wherein the transition metal hydroxide is prepared using the method of claim 10 and the transition metal oxide is prepared using the method of claim 14.

17. The method of claim 16, wherein the lithium compound comprises at least one of lithium carbonate, lithium nitrate, lithium hydroxide, lithium hydroxide monohydrate, lithium oxalate and lithium acetate.

18. The method of claim 16, wherein the coupling occurs at temperatures of about 800° C. to about 1000° C. for periods of about 8 hours to about 24 hours.

* * * * *

UNITED STATES PATENT AND TRADEMARK OFFICE
CERTIFICATE OF CORRECTION

PATENT NO. : 8,153,032 B2
APPLICATION NO. : 12/436347
DATED : April 10, 2012
INVENTOR(S) : Wenqiang Xia, Chaqing Xu and Zhanfeng Jiang It is certified that error appears in the above-identified patent and that said Letters Patent is hereby corrected as shown below:

Title page: Item 54 and Col. 1, Lines 1-4

Correct title to state:

TRANSITION METAL HYDROXIDE AND OXIDE, METHOD OF PRODUCING THE SAME, AND CATHODE MATERIAL CONTAINING THE SAME

Signed and Sealed this
Seventeenth Day of July, 2012

David J. Kappos
*Director of the United States Patent and Trademark Office*